United States Patent [19]

Gianfranchi

[11] Patent Number: 5,190,255
[45] Date of Patent: Mar. 2, 1993

[54] DEVICE FOR MECHANICALLY SECURING A FURNITURE COMPONENT, OR THE LIKE, TO A FRAME

[76] Inventor: Pier L. Gianfranchi, Via G. Luosi 5, 20131 Milano, Italy

[21] Appl. No.: 806,649

[22] Filed: Dec. 13, 1991

[30] Foreign Application Priority Data

Dec. 19, 1990 [IT] Italy .................. 22431 A/90

[51] Int. Cl.⁵ .......................................... F16M 11/24
[52] U.S. Cl. .................. 248/188.4; 248/650
[58] Field of Search ........... 248/127, 188.4, 650, 248/354.3

[56] References Cited

U.S. PATENT DOCUMENTS

| | | | |
|---|---|---|---|
| 2,725,667 | 12/1955 | Ingarra | 248/188.4 |
| 3,150,853 | 9/1964 | Lisbin | 248/188.4 |
| 3,960,352 | 6/1976 | Plattner et al. | 248/188.4 X |
| 4,313,586 | 2/1982 | Grzesnikowski | 248/188.4 |
| 4,921,370 | 5/1990 | Handler et al. | 403/234 |
| 4,991,805 | 2/1991 | Solak et al. | 248/188.4 |
| 5,056,953 | 10/1991 | Marot et al. | 403/194 |

Primary Examiner—David M. Purol
Attorney, Agent, or Firm—Ladas & Parry

[57] ABSTRACT

A device for securing components (2) to frames, such as furniture frames. The device includes a first block (5) having a first face (8), a second opposite face (10), and a hole (6) passing through its center. An impression (9) is made in the first face to engage at least a portion of the circumferential perimeter of a frame. A second block (11) also has a first face, a second opposite face, and a hole passing through its center aligned with the hole (6) passing through the first block. That face (12) of said second block which is to lie in opposition to the first face (8) of said first block also has an impression (9') complementary to the impression (9) in the first face. A pin (7), rigid at one end with the component (2), passes through the central holes of both blocks to screw at its other end into a furniture part (3) or the like with which the frame is associated.

4 Claims, 1 Drawing Sheet

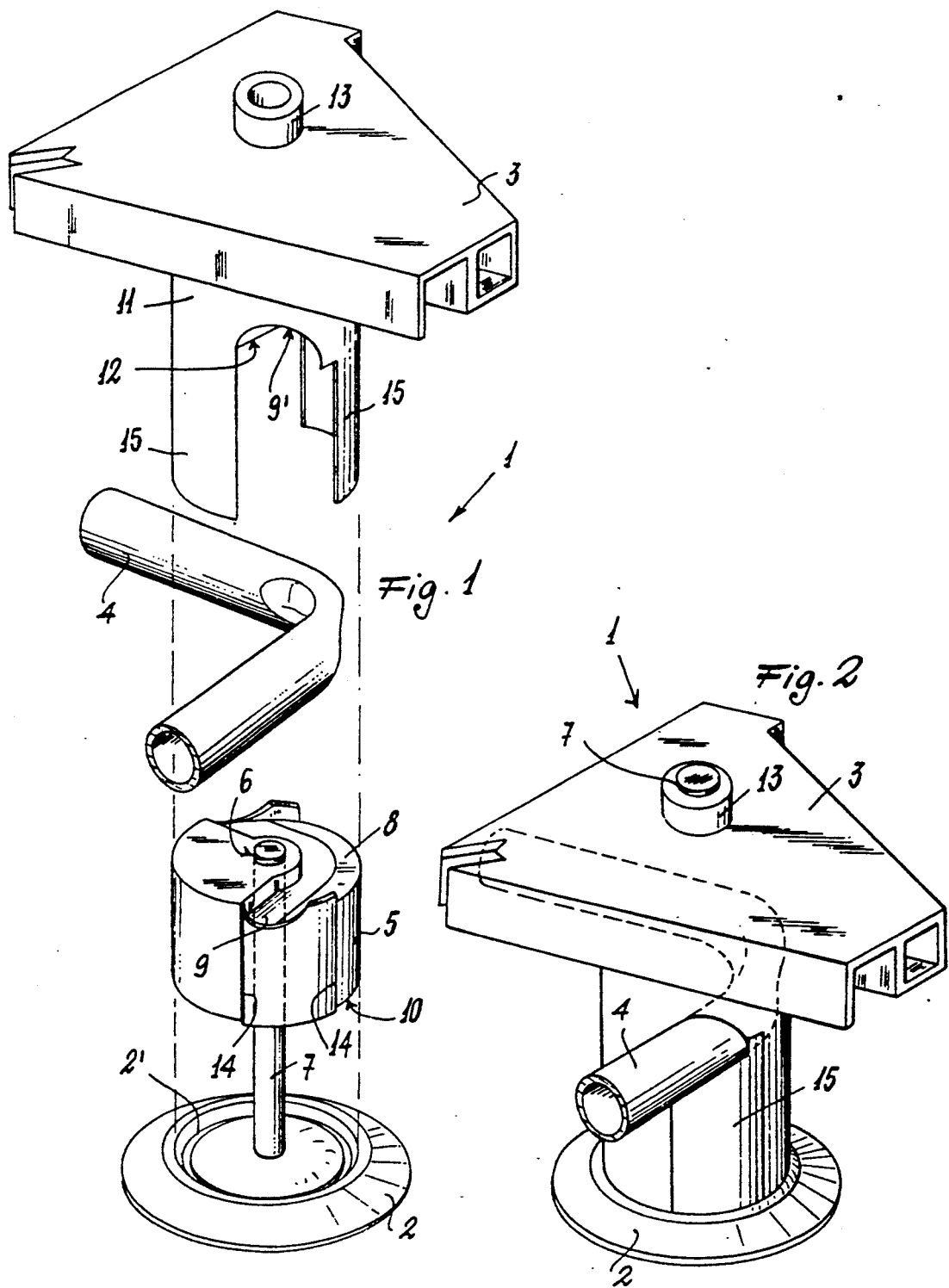

DEVICE FOR MECHANICALLY SECURING A FURNITURE COMPONENT, OR THE LIKE, TO A FRAME

BACKGROUND OF THE INVENTION

1. Field of the Invention

This invention relates to a device for mechanically securing components to frames in general, in particular furniture frames.

2. Brief Description of the Prior Art

In the specific furniture field, it is known to fix various components, in particular feet, to metal frames by welding or otherwise by relatively lengthy and complicated operations which negatively affect the final cost of the product.

SUMMARY OF THE INVENTION

An object of the present invention is to provide a device for securing components to frames in general, and in particular furniture feet, which enables this securing to be achieved quickly and simply, without the use of welding and/or similar operations. This and further objects will be apparent to the expert of the art on reading the ensuing description.

The device for securing components to frames in general, in particular furniture frames, is characterised by a first block having a first face and a second opposite face, a hole passing through the centre of said first block and an impression in said first face to engage at least a portion of the circumferential perimeter of said frame, and a second block also having a first face and a second opposite face and a hole passing through the centre of said second block aligned with the hole passing through said first block, that face of said second block which is to lie in opposition to the first face of said first block also comprising an impression complementary to the first face impression, a pin rigid at one end with said component passing through said central holes of both said blocks to screw at its other end into a furniture part or the like with which said frame is associated.

A preferred embodiment of the invention, in the form of a device for securing a foot to an armchair frame, is illustrated by way of non-limiting example in the figures of the single accompanying drawings, in which:

BRIEF DESCRIPTION OF THE PRIOR ART

FIG. 1 is an exploded view of the device; and
FIG. 2 shows the device when mounted.

DETAILED DESCRIPTION OF THE PREFERRED EMBODIMENTS

With reference to said figures, the device, indicated overall by 1, is arranged to secure a furniture component foot 2, to an object, furniture part 3, to be associated with a frame 4, which in the illustrated case is of the tubular type for an armchair.

The device consists of a first block 5, of circular cross-section in the example, which is provided centrally with a through hole 6 for receiving a pin 7 threaded at its upper end and rigidly affixed to the foot 2 at its lower end. The upper or first face 8 of the block 5 comprises an impression 9 able to engage a portion of the perimeter of the bent part of the frame 4. The lower or second face 10 is arranged to sit in a possible seat 2' provided in the foot 2.

To the lower surface of the furniture part 3 there is rigidly secured a face of a second block 11, also of circular cross-section in the example and of the same dimensions as the first block 5, its opposite face 12 comprising an impression complementary to the impression 9. A raised nut 13 internally threaded to cooperate with and engage the threaded end part of the pin 7 is provided on the furniture part 4.

To ensure correct mutual positioning of the blocks 5 and 11 and hence correct positioning of the device relative to the furniture part 3, the first block 5 comprises circumferential recesses 14 intended to receive as an exact fit the skirt portions 15 branching from the second block 11.

From the aforegoing it is apparent that on tightening the pin 7 the impressions 9 and 9' clamp against the frame 4, to consequently mechanically secure the foot 2 to the furniture part 3.

The distance between the foot 2 and the furniture part 3 can be varied by suitably varying the height of the blocks 5 and 11. The circular shape of the illustrated device 1 is dictated purely by aesthetic reasons, the device being alternatively of quadrangular or otherwise polygonal cross-section. In this latter case the insertion-fitting elements 14 and 15 obviously do not need to be provided.

I claim:

1. A device for securing a component to the frame of an object, comprising:
   a first block having a first face, a second opposite face, a central hole passing through the center of said first block, and an impression in said first face to receive and engage at least a portion of said frame;
   a second block having a third face, a fourth opposite face, a central hole passing through the center of said second block aligned with the hole passing through said first block, and an impression in said third face, complementary to the impression in said first face, to receive and engage at least a portion of said frame, said third face of said second block lying in opposition to the first face of said first block; and
   a pin, attachable at one end to said component, passing through said central holes of both said blocks, and connectable at its other end to said object.

2. The device as claimed in claim 1, wherein:
   said blocks are of cylindrical shape;
   said second block comprises at least one skirt portion on its periphery;
   said first block comprises, on its periphery, at least one recess engagable with and cooperating with said at least one skirt portion of said second block.

3. A device as claimed in claim 1, wherein said object has a threaded nut affixed thereto, and said pin engages said threaded nut affixed to said object.

4. A device as claimed in claim 2, wherein said object has a threaded nut affixed thereto, and said pin engages said threaded nut affixed to said object.

* * * * *